Patented May 22, 1928.

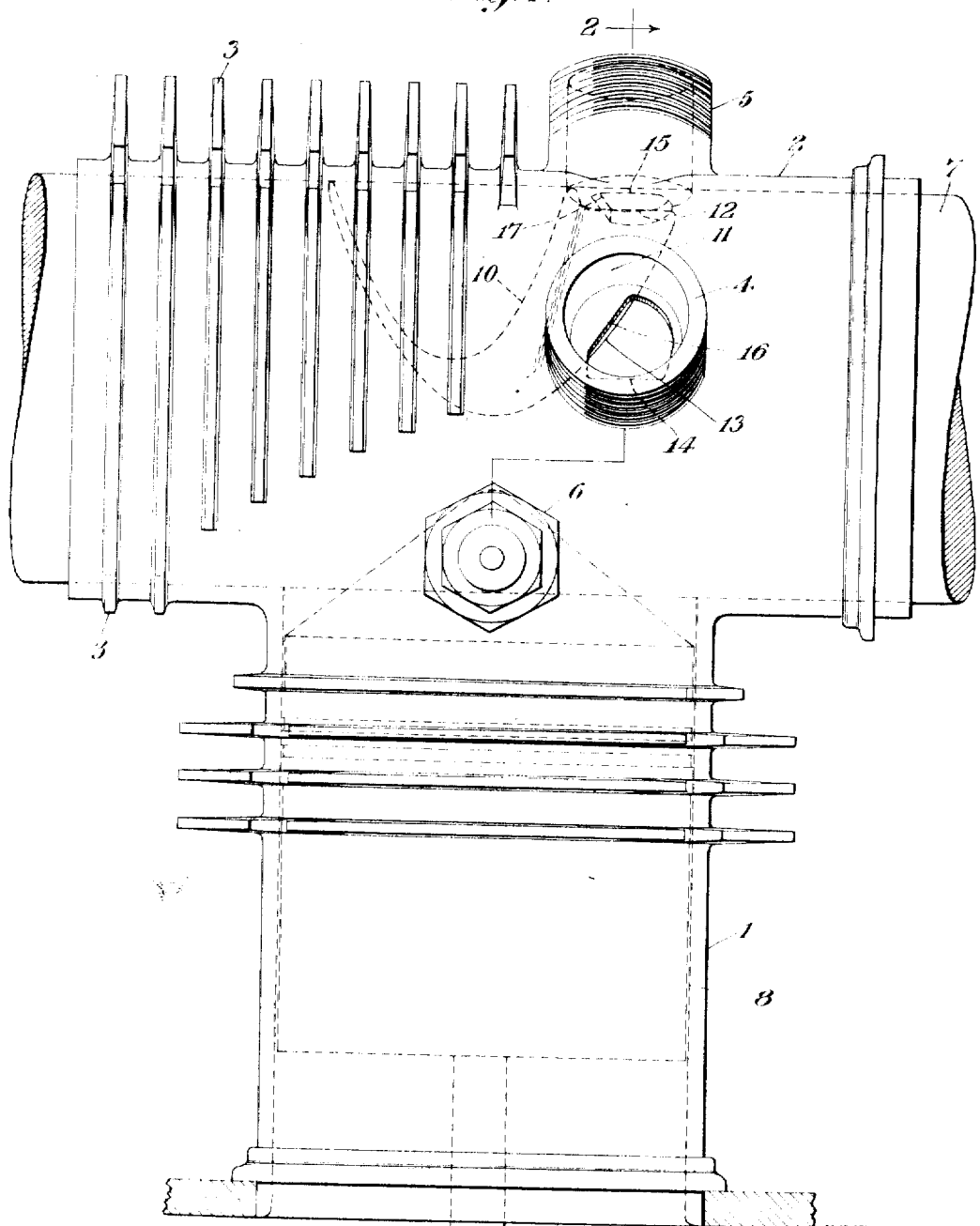

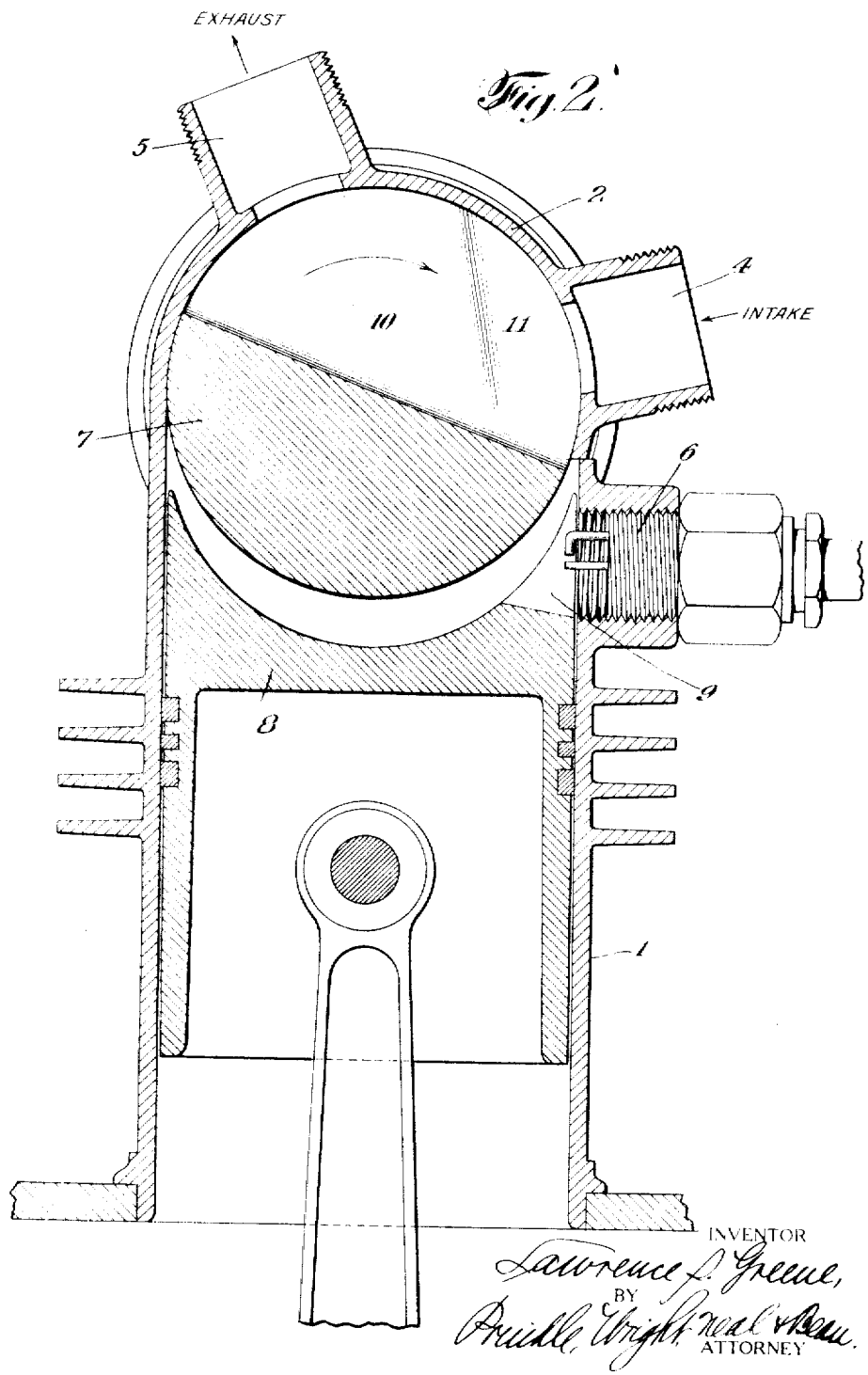

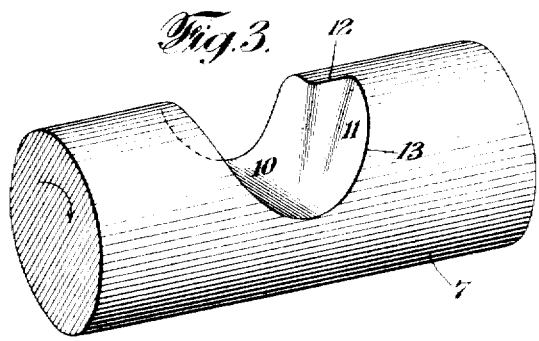
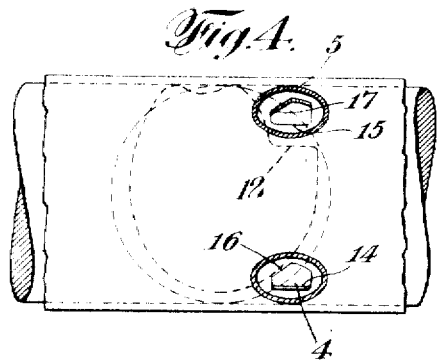
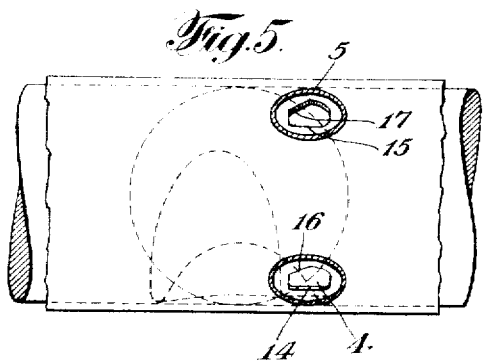
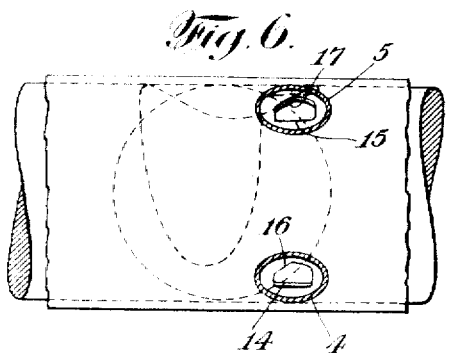
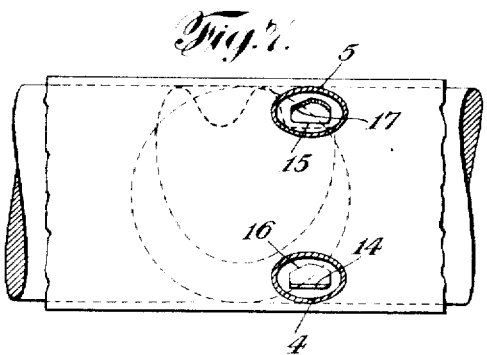

1,670,305

UNITED STATES PATENT OFFICE.

LAWRENCE SUYDAM GREENE, OF NEW CANAAN, CONNECTICUT.

INTERNAL-COMBUSTION ENGINE.

Application filed January 21, 1924, Serial No. 687,530. Renewed October 8, 1927.

This invention relates to certain improvements in internal combustion or gas engines, and more particularly to a certain form of rotary valve and combustion chamber construction.

The invention has for an object, in connection with internal combustion engines, the construction of a rotary valve mechanism containing a combustion chamber with suitable means for the complete scavenging and re-charging of the chamber.

A further object is to so construct the inlet and exhaust ports and the corresponding or registering parts of the combustion chamber, so as to provide even and quick cut-offs of the incoming and outgoing gases.

A still further object is to provide a construction which will be quite simple and yet strong, and efficient in operation.

Further objects of the invention will be apparent from the nature thereof and from the following description.

The drawings illustrate a preferred embodiment of the invention and in said drawings,—

Fig. 1 shows a side or top view of the valve and piston casings with the valve and piston shown therein in dotted lines;

Fig. 2 shows a side view taken from the left of Fig. 1;

Fig. 3 shows a perspective view of the rotary valve; and

Figs. 4 to 7 show the valve casing and the inlet and exhaust ports, together with the relative positions of the rotary valve chamber in relation thereto during one complete cycle.

While it will be understood that the invention may be embodied in various specific forms, it is desired to present hereinafter a preferred embodiment of the invention which has been found to be very advantageous and useful.

Accordingly, there is shown a piston casing 1 and a valve casing 2 at right angles thereto, the latter being provided with radiator 3 as is usual in such constructions. The valve casing is provided with an inlet port 4 and an exhaust port 5 to which are attached suitable conduits for the gases. A spark plug 6 is inserted adjacent to the inlet port and is designed to explode the gases charged within a combustion chamber constructed as will be hereinafter described.

Within the valve casing is a rotary, cylindrical valve 7 provided with means (not shown) for rotating it clockwise as viewed in Fig. 2, in the ratio of one rotation for two revolutions of the crank shaft. The latter, designated 8, fits within the piston cylinder in the usual manner but its ends is shaped to have a cylindrical form, in order to cooperate with the cylindrical valve 7 and fit substantially closely thereagainst. The upper extremity of the piston 8 contains a square cut-out 9 to avoid collision with the spark plug 6. The cylindrical wall of the piston is designed to form one side or wall of a combustion chamber, the remaining portion of which is formed within the rotary valve itself and has what may be designated generally as an elliptical or parabolic form extending to the center or axis of the valve, as may readily be seen in Figs. 1 and 3. This combustion chamber is designated 10 and lies preferably outside of the plane of the inlet and exhaust ports, i. e., it does not resgister with them in normal operation. In order, therefore, to secure a means for the inlet and exit of gases the supplemental chamber 11 is provided which is of shallow depth and extends over from the combustion chamber into the plane of the inlet and exhaust ports so as to register with them, whereby gases entering or leaving said ports will first pass through this supplemental chamber on the way to or from the combustion chamber.

The outlines or borders of said supplemental chamber may be clearly seen in Fig. 3 and comprise a border or line 12 parallel with the axis of the valve 7, and a curved border or line 13, meeting the line of the combustion chamber 10 and the bottom thereof. The said border 12 is designed to register with the inlet and exhaust ports and for this purpose these ports have a corresponding parallel line at the rear thereof indicated by 14 and 15 respectively. The ports 14 and 15 are approximately quadrant shaped and are bounded on two sides by straight walls arranged substantially at an angle of 45° and connected at their outer ends by a curved wall. The inner ends of the straight sides do not directly connect but are joined by a short wall or edge arranged at right angles to one of the straight sides and at obtuse angle to the other straight side.

The left sides or borders 16 and 17 of the inlet and exhaust ports, respectively, are curved to substantially parallel the curved line of the supplemental chamber as it moves across said ports. By these constructions it will be apparent that the gases are cut off in an even and quick manner as they enter and leave the supplemental chamber, i. e., the cut-off is practically instantaneous along a straight line, forming a considerable portion of the periphery of the port.

In the operation of the mechanism the description will proceed on the basis of the Otto cycle, wherein the rotary valve makes one complete revolution for every two revolutions of the crank shaft, i. e., the piston goes through the usual operations of compressing and scavenging the gas in the combustion chamber within the valve during one rotation thereof. As viewed in Fig. 2 this rotation is clockwise.

Beginning with the intake of a charge, it will be seen that as the line 13 in its revolution approaches the port 4 it will momentarily coincide with the line 16, and thereafter pass this line whereupon the supplemental chamber 11 will be gradually opened to the intake port and a charge of gas will pass through the chamber to the combustion chamber. As the valve continues to rotate the line 12 will eventually coincide with line 14 and a quick cut-off will be made.

The piston now compresses this charge and it is then fired to provide the explosive force for driving the piston back and furnish the energy for the engine, as will be readily understood. As the valve continues to rotate it will eventually bring the line 13 to coincide with the line 15 of the exhaust valve whereupon on further rotation the latter will be opened to the supplemental chamber and the gases will be exhausted from the combustion chamber. Further rotation of the valve brings the line 12 opposite the line 17 whereupon the exhaust will be cut off and the valve very shortly thereafter be ready to renew the cycle beginning with the inlet port. Figs. 4 to 7 illustrate this movement. The intake or inlet ports are designated 4, and the exhaust ports 5, while the combustion and supplemental chambers are shown in dotted outlines as they appear projected upon the plane of view taken of these figures.

Corresponding parts are identically designated as in the previous figures, so that the various positions will be entirely clear.

It will be seen that in Fig. 4 the line 12 has just past the exhaust port and is moved toward the intake port to recommence a cycle. In Fig. 5 this movement has progressed through about one-quarter of a revolution to the time when the cut-off has been made at the intake or inlet port. Fig. 6 shows the position of the valve after a considerable rotation and when the exhaust is about to be opened. Fig. 7 shows the position when the exhaust is closed and is therefore just in advance of the position shown in Fig. 4.

It will thus be apparent that a simple and strong construction has been provided for a rotary valve of this type wherein the combustion chamber is cut out of the cylindrical valve.

A highly advantageous feature of this construction consists in the manner of arranging the supplemental chamber with respect to the inlet and exhaust ports and the combustion chamber, which is preferably not in line or registry with said ports. The supplemental chamber being small has made it possible to provide a quick and even cut-off by forming a straight line of the chamber, parallel with the axis of rotation, to coincide with the line of the ports, and thus eliminating the combustion chamber from actual registry with these ports.

Many other advantages of construction will be apparent from an examination of the description and the actual operation of the valve.

As many apparently widely different embodiments of this invention may be made without departing from the spirit thereof, it is understood that I do not intend to limit myself to the specific embodiment above described, except as indicated in the appended claims, and while I have illustrated the adaptation of my invention to an Otto type internal combustion engine, it is to be expressly understood that it is adapted for use in connection with engines and motors of other types.

I claim:

1. In an internal combustion engine having a cylinder and a piston therein in combination with a valve casing provided with inlet and exhaust ports and ignition means; a rotary valve containing a combustion chamber and a supplemental chamber communicating therewith and so positioned as to register with said ports.

2. The invention in claim 1 wherein the combustion chamber is so located as not to register with the ports.

3. In an internal combustion engine having a cylinder and a piston therein in combination with a valve casing provided with inlet and exhaust ports and ignition means; a rotary valve containing a combustion chamber and a supplemental chamber positioned in the plane of the ports and communicating with the combustion chamber.

4. In an internal combustion engine having a cylinder and a piston therein in combination with a valve casing provided with inlet and exhaust ports and ignition means; a rotary valve containing a combustion chamber and a supplemental chamber, the combustion chamber having a generally elliptical section extending to the axis of the valve and having its side walls disposed transversely of the valve and the supplemental chamber communicating with the combustion chamber and so positioned as to register with said ports.

5. The invention in claim 1 wherein the supplemental chamber is of shallow depth.

6. The invention in claim 1 wherein the inlet and exhaust ports have rear sides or lines parallel with the axis of the valve, and the supplemental chamber has a similar parallel line to register with said port lines in order to provide an even and quick cut-off.

7. The invention in claim 1 wherein the inlet and exhaust ports have diagonally curved sides to substantially parallel the border line of said supplemental chamber.

In testimony that I claim the foregoing, I have hereunto set my hand this 10th day of December, 1923.

LAWRENCE SUYDAM GREENE.

CERTIFICATE OF CORRECTION.

Patent No. 1,670,305.                             Granted May 22, 1928, to

LAWRENCE SUYDAM GREENE.

It is hereby certified that error appears in the printed specification of the above numbered patent requiring correction as follows: Page 1, line 61, for the word "ends" read "end"; page 3, line 6, claim 5, for the numeral "1" read "4"; and that the said Letters Patent should be read with these corrections therein that the same may conform to the record of the case in the Patent Office.

Signed and sealed this 19th day of June, A. D. 1928.

(Seal)

M. J. Moore,
Acting Commissioner of Patents.

valve and having its side walls disposed transversely of the valve and the supplemental chamber communicating with the combustion chamber and so positioned as to register with said ports.

5. The invention in claim 1 wherein the supplemental chamber is of shallow depth.

6. The invention in claim 1 wherein the inlet and exhaust ports have rear sides or lines parallel with the axis of the valve, and the supplemental chamber has a similar parallel line to register with said port lines in order to provide an even and quick cut-off.

7. The invention in claim 1 wherein the inlet and exhaust ports have diagonally curved sides to substantially parallel the border line of said supplemental chamber.

In testimony that I claim the foregoing, I have hereunto set my hand this 10th day of December, 1923.

LAWRENCE SUYDAM GREENE.

CERTIFICATE OF CORRECTION.

Patent No. 1,670,305.                Granted May 22, 1928, to

LAWRENCE SUYDAM GREENE.

It is hereby certified that error appears in the printed specification of the above numbered patent requiring correction as follows: Page 1, line 61, for the word "ends" read "end"; page 3, line 6, claim 5, for the numeral "1" read "4"; and that the said Letters Patent should be read with these corrections therein that the same may conform to the record of the case in the Patent Office.

Signed and sealed this 19th day of June, A. D. 1928.

(Seal)

M. J. Moore,
Acting Commissioner of Patents.